Nov. 6, 1956  H. C. DE WITT  2,769,514
FREQUENCY SELECTOR DEVICE
Filed May 3, 1951 4 Sheets-Sheet 1

INVENTOR.
HENRY CLINTON DE WITT
BY
Harry M. Saragovitz
Attorney

Nov. 6, 1956  H. C. DE WITT  2,769,514
FREQUENCY SELECTOR DEVICE
Filed May 3, 1951  4 Sheets-Sheet 2

INVENTOR.
HENRY CLINTON DE WITT
BY
Harry M. Saragovitz
Attorney

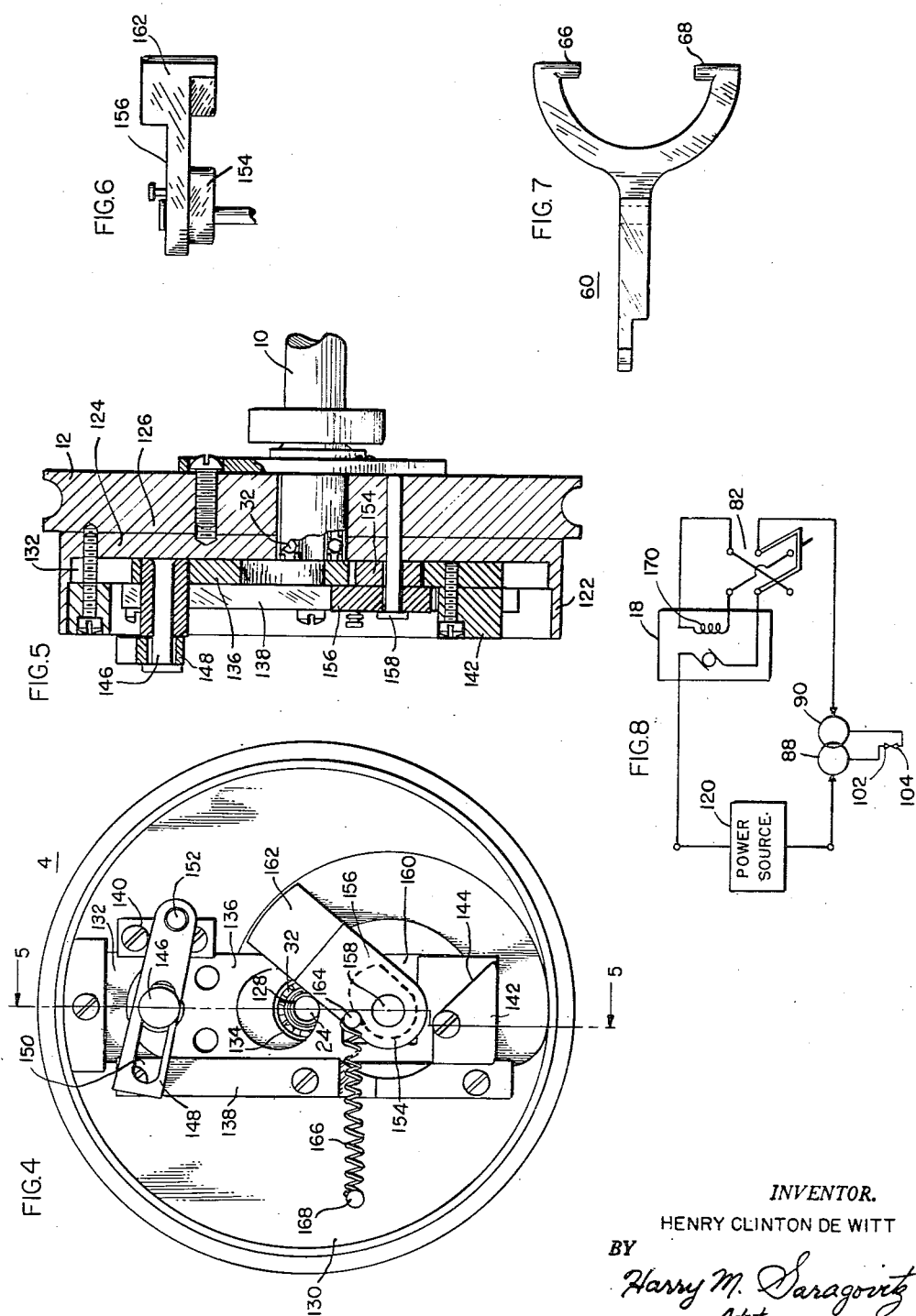

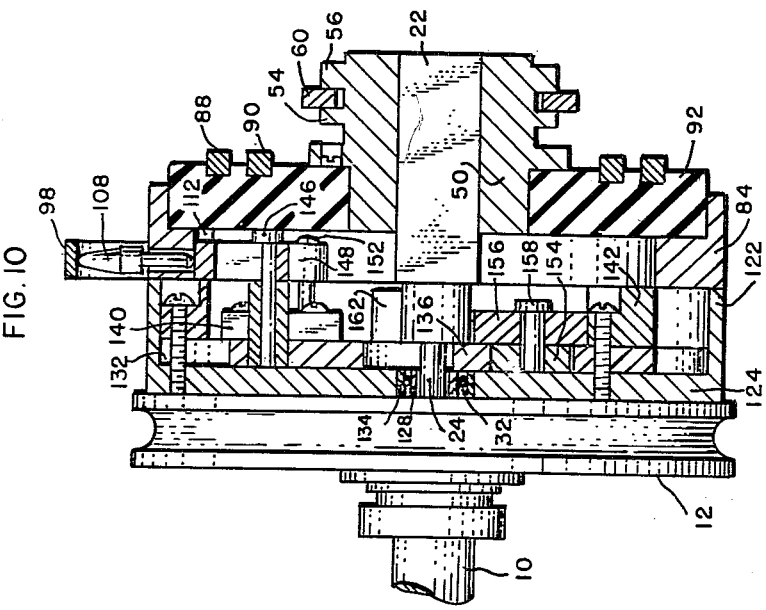
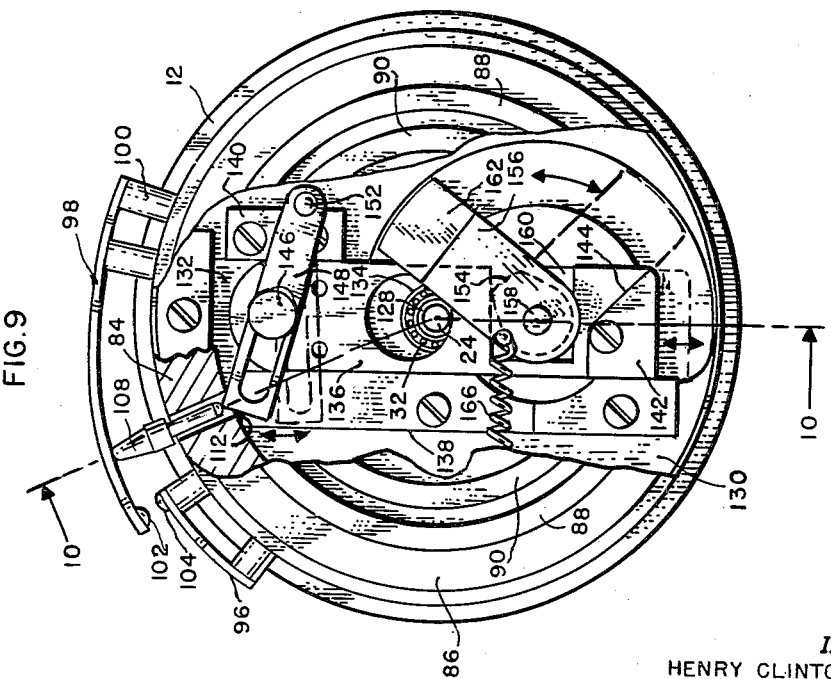

United States Patent Office 2,769,514
Patented Nov. 6, 1956

2,769,514

FREQUENCY SELECTOR DEVICE

Henry Clinton De Witt, New Providence, N. J., assignor to the United States of America as represented by the Secretary of the Army Application May 3, 1951, Serial No. 224,380

4 Claims. (Cl. 192—.02)

This invention relates to an automatic frequency selector mechanism and more particularly to a selective clutch assembly for automatically and accurately selecting a particular frequency from a predetermined frequency spectrum. While the invention is subject to a wide range of applications, it is especially suited for use in conjunction with a motor driven tuning assembly which determines the operating frequency spectrum of a search receiver and will be particularly described in connection with apparatus containing such a receiver.

In search receivers employing a motor driven tuning assembly, it is sometimes desirable to examine a particular frequency of the spectrum swept by said assembly. Heretofore, this was achieved by stopping the motor and then resetting the tuning assembly to the desired position. Such a process is necessarily slow and time consuming.

It is therefore an object of this invention to provide an improved frequency selector mechanism.

It is a further object of this invention to provide a clutch assembly whereby a particular frequency may be selected automatically.

It is a further object of this invention to provide a clutch assembly designed to permit stopping of a rapidly rotating tuning member of considerable mass at a predetermined point corresponding to a prescribed frequency spectrum.

It is still a further object of the invention to provide a clutch assembly for automatically and rapidly selecting a predetermined frequency from an available frequency spectrum.

In accordance with the invention, the frequency selector mechanism comprises a clutch assembly including normally disengaged first and second clutch members axially disposed on a rotatable shaft, motor means for rotating the first clutch member either clockwise or counterclockwise, manual means for rotatably positioning the second clutch member, control means for axially positioning the second clutch member to engage the first clutch member and to simultaneously reverse the electrical connections to the motor for braking the first clutch member, centrifugally responsive means to maintain the clutch members in the engaged position, and switch means for deenergizing the motor when the clutch members are in the engaged position.

For a better understanding of the present invention together with other and further objects thereof, reference is made to the following description taken in connection with the accompanying drawings in which;

Fig. 4 is a plan view of a second clutch member showing particularly the internal structure;

Fig. 5 is a sectional view along the line 5—5 of Fig. 4, and looking in the direction of the arrows indicated thereon;

Fig. 6 is a side elevation of the cam and lever arm employed in the second clutch member;

Fig. 7 is a plan view of the yoke connecting lever;

Fig. 8 is a diagrammatic illustration of the motor control circuit for the frequency selector mechanism;

Fig. 9 is a plan view, partially broken away, of the clutch assembly showing the operating details thereof; and Fig. 10 is a sectional view taken along the line 10—10 of Fig. 9 and looking in the direction of the arrows indicated thereon.

Figure 1:
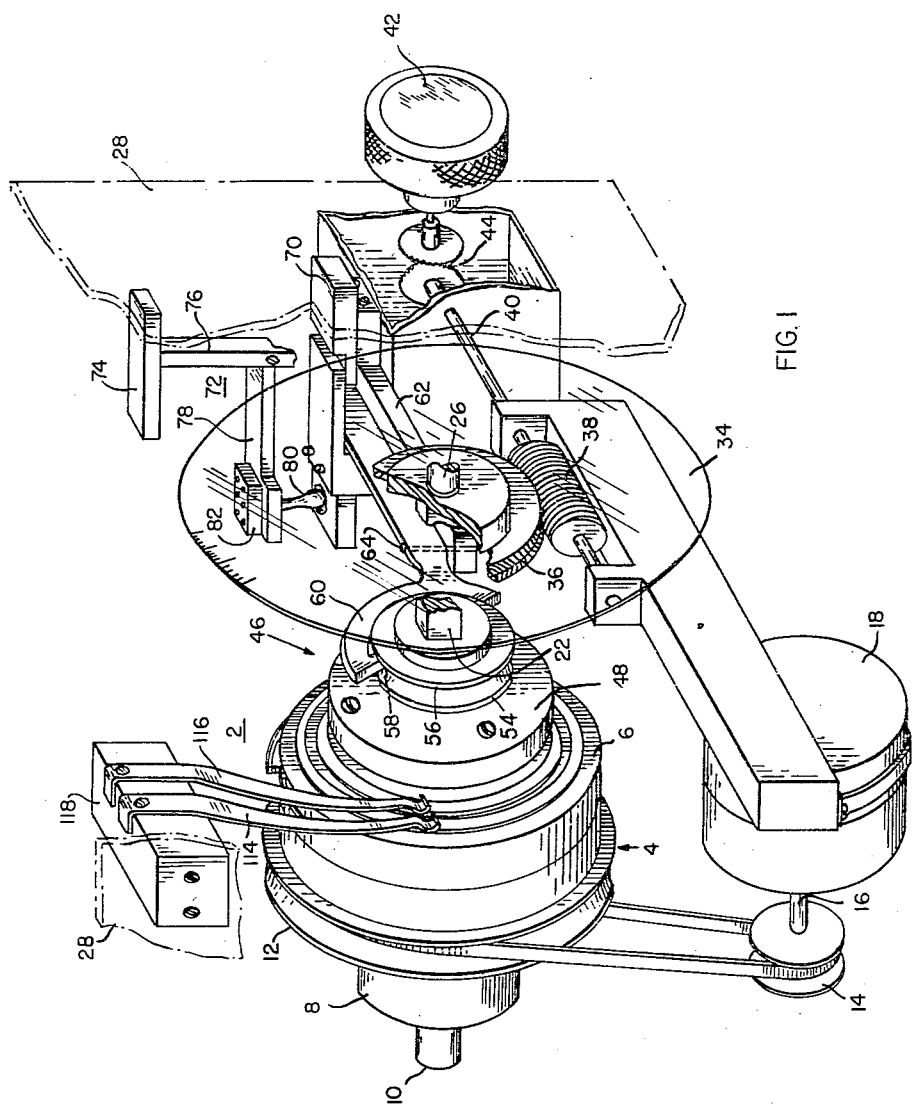
Fig. 1 is perspective view of the complete assembly of the frequency selector mechanism with parts broken away to show details of construction.

Referring now to the drawings, and more particularly to Figs. 1–5 thereof, there is shown at 2 an automatic selective clutch assembly in the engaged or selected position. The assembly comprises a motor driven rotatable member 4, hereinafter referred to as the first clutch member, and a manually operated member 6, hereinafter referred to as the second clutch member. At 8 there is shown a tuning device which may comprise the tuning condenser of a conventional search receiver. On the shaft 10 of the rotary element of the tuning device there is mounted a pulley 12 by means of which it is rotatably driven, said pulley being belted to a second pulley 14 mounted on shaft 16 of a reversible type electric motor 18. Affixed to pulley 12 is first clutch member 4 which is adapted to mechanically engage or disengage second clutch member 6 in a manner more fully explained below.

Figures 2, 3:
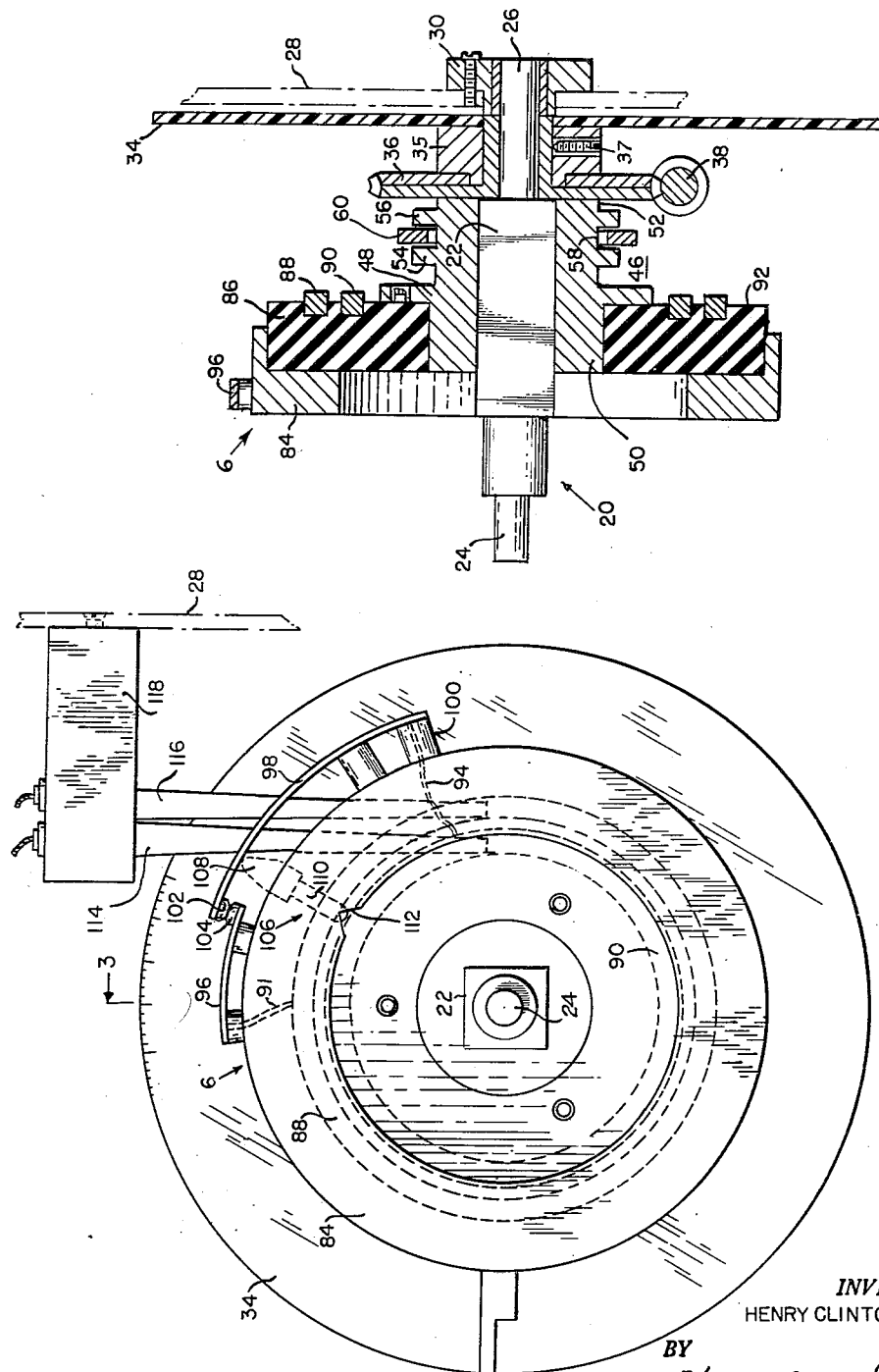
Fig. 2 is a plan view of one clutch member and its associated elements.
Fig. 3 is a sectional view along the line 3—3 of Fig. 2 and looking in the direction of the arrows indicated thereon.

Clutch members 4 and 6 are axially disposed along manually rotatable solid shaft 20 (Fig. 3) which includes a rectangular longitudinal section 22 disposed between two cylindrical end sections 24 and 26, and integral therewith. As shown, cylindrical end section 26 extends freely through a support 28, which may be the receiver chassis, and is journaled in bearing 30 affixed to chassis 28. Cylindrical end section 24 is journaled in a central bearing 32 (Fig. 5) provided in first clutch member 4 which is adapted to rotate freely with respect to manually operated shaft 20. Affixed to cylindrical end section 26 of shaft 20, and rotatable therewith, is a calibrated index dial 34 and a worm gear 36 which meshes with a worm 38 formed at one end of a manually operated shaft 40. As shown in Figure 3, index dial 34 is spaced from worm gear 36 by spacer element 35 one end of which is affixed to index dial 34 and which is affixed to worm gear 36 by means of set screw 37 so that dial 34 and worm gear 36 are rotated as a unit. Any suitable means may be provided to minimize the backlash between worm gear 36 and worm 38. One such means (not shown) may be provided by connecting a tensioned spring between a stud affixed to worm gear 36 and a stud mounted on spacer element 35 which may be provided with a small flat peripheral portion to support the tensioned spring. Such an arrangement is well known in the art and is commonly referred to as a spring loaded worm gear. Shaft 40 may be conventionally rotated by a knob 42 through bevel gearing 44 and suitable reduction gears, not shown. Second clutch member 6 is longitudinally slidable and rotatably mounted on rectangular section 22 of shaft 20 by means of a hub adapter 46 comprising a mounting plate 48 and protruding cylindrical end sections 50 and 52 integral therewith. End section 52 is provided with spaced circular flanges 54 and 56 to form a circumferential U-shaped guide channel.

To longitudinally position second clutch member 6 along the surface of rectangular section 22 of shaft 20 there is provided a yoke lever member 60 (Fig. 7) pivotally mounted on horizontal support member 62 by means of pin 64. One end of yoke member 60 is provided with two spaced coaxial inwardly extending trunnion members 66 and 68 (Fig. 7) which are in abutment with the circumferential surface of guide channel 58. The other end of yoke member 60 is affixed to lower switch arm 70 of index control assembly 72 which extends upwardly from support member 62 and is affixed thereto. Thus, yoke lever member 60 is pivotally mounted on support member 62 by means of pin 64 intermediate lower switch arm 70 and circumferential guide channel 58 on hub adapter 46.

Index control assembly 72 includes said lower switch arm and an upper switch arm 74 vertically spaced therefrom. Both switch arms are positioned parallel to shaft 20 and are connected by a link arm 76 centrally pivoted on horizontal bracket 78 disposed between said switch arms. As shown, one end of each of said switch arms extend through receiver chassis 28. The other end of lower switch arm 70 is provided with an aperture to accommodate projecting lever 80 of toggle switch 82 which, when operated in either one direction or the other as a double-pole double-throw switch, controls the direction of rotation of reversible type electric motor 18.

It can readily be seen that by this arrangement, clutch member 6 may be axially positioned on shaft section 22 in either of two positions by means of control assembly 72 and, in addition, may be rotatably positioned in accordance with any desired position of index dial 34 by means of worm 38 and worm gear 36. With clutch member 6 in one axial position, the clutch members are engaged and with clutch member 6 in the other axial position, the clutch members are disengaged. Thus, when upper switch arm 70 is pushed in, second clutch member 6 is longitudinally positioned on shaft 20 to engage first clutch member 4 and, simultaneously, toggle switch 82 is actuated to rotate motor 18 in one direction, which may be either clockwise or counterclockwise. When lower switch arm 70 is pushed in, the longitudinal position of clutch member 6 is reversed to disengage first clutch member 4, and simultaneously toggle switch 82 is actuated to effectively reverse the direction of rotation of motor 18.

As shown in Figs. 2 and 3, second clutch member 6 comprises a cup-shaped annular ring 84 and an annular commutator disc 86, made of Bakelite or other suitable insulation material, affixed within the depressed surface of said annular ring and in abutment therewith. The inner diameter of commutator disc 86 encompasses cylindrical end section 50 of hub adapter 46 and is affixed to mounting plate 48 thereof. Two spaced concentric slip rings 88 and 90 are imbedded in exposed surface 92 of commutator disc 86. Slip rings 88 and 90 are respectively connected by conductor leads 91 and 94 to arcuate spring contact members 96 and 98 which are mounted circumferentially above annular ring 84 by means of insulator spacers 100. Each of said spring contact members are terminated at one end by contacts 102 and 104, respectively, contact 102 of spring contact member 98 being superimposed on contact 104 and in abutment therewith only when clutch members 4 and 6 are disengaged. A movable insulated contact pin 106 comprising a tapered head 108 and a shank 110 is provided in annular ring 84 to actuate spring contact member 98 when the clutch members are engaged, and thus open contacts 102 and 104. As shown, pin head 108 may abut the underside of spring contact member 98 and is affixed to one end of shank 110 which extends freely through a radial aperture formed between the outer and inner diameters of annular ring 84. The other end of shank 110 protrudes through a V-shaped notch 112 provided in the periphery of the inner diameter of annular ring 84. When clutch members 4 and 6 are disengaged, pin head 108 is supported in position at its base by means of a conventional countersink.

Associated with each of the slip rings 88 and 90 is a resilient metal contact brush, these being shown respectively at 116 and 114 suitably supported by insulating block 118 which may be affixed to the receiver chassis. As will hereinafter be explained, contact brushes 114 and 116 connect a power source 120 (Fig. 8) to reversible electric motor 18 when the clutch members are disengaged and contact members 102 and 104 are closed.

Figs. 4 and 5 illustrate the detailed construction of first clutch member 4 which, as hereinbefore described, is rotatably driven in unison with tuning device 8 by means of belt driven pulleys 12 and 14. Clutch member 4 constitutes a cup-shaped cylindrical housing 122 having a substantially thick base portion 124 provided with a central bearing 32. Outer surface 126 of said base is affixed to pulley 12 which is rigidly mounted on shaft 10 of the rotary tuning device 8. The inner race 128 of bearing 32 is linearly aligned with shaft 10 and is coaxial therewith. It is preferable, although not essential to my invention, that the outer diameter of housing 122 be substantially the same as the outer diameter of annular ring 84.

Inner surface 130 of base 124 is provided with a diametrical channel 132 having a wide dimension slightly greater than the diameter of outer race 134 of central bearing 32. Superimposed on the surface of channel 132 is a slideable cam follower member 136 maintained in sliding contact with said channel surface by means of parallel gib guide members 138 and 140 affixed to inner surface 130. Extending upwardly from the surface of slideable member 136 at one end thereof is a counterweight 142 having one end in abutment with gib guide member 138, the other end thereof being provided with a beveled edge 144 as shown. Extending upwardly from the surface of slideable member 136 at the other end thereof is a stud 146 which protrudes beyond the periphery of cylindrical housing 122. An elongated pawl 148 having a longitudinal slot 150 is pivotally mounted on a stud 152 extending upwardly from inner surface 130 adjacent gib member 140. Slotted pawl portion 150 links with stud member 146 in such a manner that pawl 148 is disposed substantially across slideable member 136 and is vertically spaced therefrom. By this arrangement the annular movement of pawl 148 about stud 152 may be affected by the rectilinear movement of slideable member 136.

Rectilinear motion is applied to slideable member 136 by means of a centrifugally actuated cam and spring arrangement. Cam 154 is affixed to the underside of centrifugally responsive lever arm 156 (Fig. 6) pivotally mounted on pintle 158 which extends upwardly from channeled surface 132 and is substantially positioned at the center of a rectangular shaped aperture 160 provided in slideable member 136 adjacent counterweight 142. Cam 154 is adapted to bear on the exposed edges of rectangular aperture 160 to linearly position slideable member 136 in either one of two extreme positions, thus affecting the angular movement of pawl 148 about stud 152. Free end 162 of lever arm 156 is weighted so as to be responsive to the influence of centrifugal force for positioning slideable member 136 to one extreme position when cylindrical housing 122 is rotatably driven in one direction by motor 18 and clutch members 4 and 6 are disengaged. Thus, when cylindrical housing member 122 is rotatably driven in said one direction by motor 18, lever arm 156 is actuated by centrifugal force to pivot about pintle 158 and actuate cam 154 which, in turn, positions slideable member 136. As explained above, pawl 148 is actuated by slideable member 136, and for this position pawl 148 may be considered to be retracted or disengaged.

Extending upwardly from lever arm 156 adjacent pintle 158 is a stud 164 to which is attached one end of spring member 166. The other end of spring member 166 is rigidly attached to stud 168 extending upwardly from base surface 130 to provide spring tension for actuating lever arm 156 and thus positioning slideable member 136 at the other extreme position when cylindrical housing member 122 is at rest. For this position of slideable member 136, pawl 148 is in position to engage the V-shaped notch 112 in second clutch member 6 and thus maintain the clutch members in the engaged position.

The operation of my invention will be best understood by referring to Fig. 8 which shows the electrical circuit for the frequency selector mechanism. It is to be assumed that clutch members 4 and 6 are normally disengaged and that, when disengaged, first clutch member 4 is driven clockwise by motor 18 which is actuated by toggle switch 82. It is also to be assumed that, with first clutch plate member 4 rotating clockwise, second clutch member 6 is axially displaced on shaft 20 to preclude engagement of the clutch members. It is further to be assumed that in the disengaged position upper switch arm 74 is out and lower switch arm 70 is in.

With the clutch members thus disengaged, contacts 102 and 104 are closed and, as shown in Fig. 8, power is supplied to motor field winding 170 through slip rings 88 and 90 and toggle switch 82. Due to the centrifugal force developed by rotatably driven clutch member 4, lever arm 156 is impelled outwardly thus actuating slideable member 136. Pawl 148, in turn, follows the motion of slideable member 136 and is in a retracted, or disengaged, position. So long as first clutch plate 4 is rotatably driven by motor 18, pawl 148 is maintained in this position by centrifugal force.

When it is desired to select a predetermined frequency, second clutch member 6 is manually rotated by knob 42 through gears 44 to a prescribed position indicated on calibrated index dial 34. To engage clutch members in the prescribed index position upper switch arm 74 is pushed in which, in turn, reverses the position of lower switch arm 70 by means of link arm 76. Since toggle switch 82 is attached to one end of lower switch arm 70, the reversal of said lower arm causes switch 82 to be reversed, thus effectively tending to reverse the direction of rotation of motor 18 and thereby causing a braking action affects the speed of rotation of clutch member 4 in the clockwise direction. The rotational speed of first clutch member 4 is thus decreased to reduce the momentum of tuning device 8 and diminish the influence of the centrifugal force. As a result, during the period of reduced momentum, lever arm 156 is finally impelled inwardly by spring member 166 thereby reversing the position of slideable member 136 and, in turn, the angular position of pawl 148. In this position pawl 148 is adapted to rigidly connect with V-shaped notch 112 in second clutch member 6. At this instant, contact pin 106 is actuated by pawl 148 to open contacts 102 and 104. When said contacts are open, the electrical circuit connection to motor 18 through slip rings 88 and 90 is interrupted and, consequently, motor 18 is deenergized and clutch members 4 and 6 are at a standstill and are rigidly engaged.

To disengage the clutch members, lower switch arm 70 is pushed in, thereby separating the clutch members and laterally removing pawl 148 from notch 112. Simultaneously therewith, power is again supplied to motor 18 through slip ring contacts 102 and 104, which, with pawl 148 removed from notch 112, are now in contact, and consequently pawl 148 is again placed in the retracted, or disengaged under the influence of centrifugal force.

While there has been described what is at present considered to be the preferred embodiment of this invention, it will be obvious to those skilled in the art that various changes and modifications may be made therein without departing from the invention, and it is therefore aimed in the appended claims to cover all such changes and modifications as fall within the true spirit and scope of the invention.

What is claimed is:

1. A clutch assembly comprising a rotatably driven first member and a rotatable second member adapted to engage said first member, said first member comprising a cylindrical cup-shaped housing having a solid base, a diametral channel disposed within said base, a slideable cam follower member superimposed in said channel, means for maintaining said slideable member in sliding contact with the surface of said channel, an elongated pawl pivotally mounted on said base, linkage means connecting said pawl and one end of said slideable member whereby rectilinear movement of said slideable member affects angular movement of said pawl, a rectangular aperture in the other end of said slideable member, a cam disposed within said aperture and adapted to abut the edges thereof to actuate said slideable member, and a pivotally mounted centrifugally responsive lever arm superimposed on said slideable member and affixed to said cam for actuating said cam to disengage said clutch members when said first member is rotatably driven.

2. An automatic selective clutch assembly comprising a rotatable shaft, normally disengaged mutually opposing first and second clutch members axially disposed along said shaft, said first clutch member being rotatably mounted on said shaft, said second clutch member being longitudinally slidable and rotatably mounted on said shaft, power means for driving said first clutch member in a prescribed direction of rotation, manual means for rotatably positioning said second clutch member to a predetermined rotary position on said shaft, means operatively associated with said second clutch member for axially positioning said second clutch member on said shaft to engage said first clutch member and simultaneously reverse the direction of rotation of said power means for braking said first clutch member, centrifugally responsive means operatively associated with said first clutch member to mechanically engage said second clutch member whereby said clutch members are maintained in said predetermined rotary position, and switch means in circuit with said power means affixed to said second clutch member and adapted to be actuated by said centrifugally responsive means to deenergize said power means when said members are in the engaged position.

3. An automatic selective clutch assembly comprising a rotatable shaft, normally disengaged mutually opposing first and second clutch members axially disposed along said shaft, said first clutch member being rotatably mounted on said shaft and said second clutch member being longitudinally slidable and rotatably mounted on said shaft, power means for driving said first clutch member in a prescribed direction of rotation, manual means for rotatably positioning said second clutch member to a predetermined rotary position on said shaft, control means for axially positioning said second clutch member on said shaft to engage said first clutch member and simultaneously reverse the direction of said power means for braking said first clutch member, a centrifugally responsive pawl pivotally mounted in said first clutch member and adapted to maintain said engaged members in said predetermined rotary position, and switch means in circuit with said power means mounted on said second clutch member and adapted to be actuated by said pawl to deenergize said power means when said members are in the engaged position.

4. The device set forth in claim 3 wherein said control means comprises a tubular hub adapter affixed to said second clutch member and girdling said shaft, a pair of spaced flanges circumferentially disposed on said tubular adapter and integral therewith to form a U-shaped channel, a yoke lever member having at one end thereof two spaced coaxial inwardly extending trunnion members positioned in said U-shaped channel, means for supporting said yoke member in a plane substantially perpendicular to said shaft, means for pivotally mounting said yoke lever member intermediate the ends thereof, and means affixed to the other end of said yoke member for actuating said yoke member whereby said second clutch member is positioned axially on said shaft, said last mentioned means being in circuit with said power means.

References Cited in the file of this patent
UNITED STATES PATENTS

| | | |
|---|---|---|
| 2,320,808 | Van Lammeren et al. | June 1, 1943 |
| 2,384,418 | Edmondson | Sept. 4, 1945 |
| 2,528,489 | Bednash et al. | Nov. 7, 1950 |